(12) United States Patent
Nock

(10) Patent No.: US 7,549,394 B2
(45) Date of Patent: Jun. 23, 2009

(54) PERCH ASSEMBLY

(75) Inventor: Robert Kenneth Nock, Mellieha (MT)

(73) Assignee: C J Wildbird Foods Limited, Shrewsbury (GB)

( * ) Notice: Subject to any disclaimer, the term of this patent is extended or adjusted under 35 U.S.C. 154(b) by 564 days.

(21) Appl. No.: 11/498,741

(22) Filed: Aug. 4, 2006

(65) Prior Publication Data

US 2007/0034160 A1 Feb. 15, 2007

(30) Foreign Application Priority Data

Aug. 6, 2005 (GB) .................................. 0516200.3

(51) Int. Cl.
*A01K 61/02* (2006.01)
(52) U.S. Cl. ................... 119/57.8; 119/57.9; 119/52.3
(58) Field of Classification Search ............... 119/57.8, 119/52.2, 51.01, 63, 57.9, 52.3
See application file for complete search history.

(56) References Cited

U.S. PATENT DOCUMENTS

| | | | |
|---|---|---|---|
| 4,223,637 A | 9/1980 | Keefe | |
| 4,498,423 A * | 2/1985 | Gainsboro et al. | 119/57.8 |
| 4,841,910 A * | 6/1989 | Kilham | 119/468 |
| 4,881,491 A * | 11/1989 | Brown | 119/51.01 |
| 5,105,765 A * | 4/1992 | Loken | 119/57.9 |
| 6,408,788 B1 * | 6/2002 | Lieb et al. | 119/52.2 |
| 6,415,737 B2 * | 7/2002 | Banyas et al. | 119/57.9 |
| 6,578,518 B1 * | 6/2003 | Conforti | 119/57.8 |
| 6,622,654 B2 * | 9/2003 | Fasino | 119/57.9 |
| 7,021,241 B2 * | 4/2006 | Nock | 119/57.8 |
| 7,086,352 B2 * | 8/2006 | Goodger | 119/537 |
| 2007/0227454 A1 * | 10/2007 | Fahey | 119/57.8 |
| 2009/0020075 A1 * | 1/2009 | Wood et al. | 119/57.8 |

FOREIGN PATENT DOCUMENTS

| | | |
|---|---|---|
| EP | 1 452 092 A | 9/2004 |
| GB | 2398719 A | 9/2004 |

OTHER PUBLICATIONS

European Patent Office Search Report issued Oct. 27, 2006 in corresponding EP 062537.8-1260.

* cited by examiner

*Primary Examiner*—Yvonne R. Abbott
(74) *Attorney, Agent, or Firm*—Buchanan Ingersoll & Rooney PC

(57) ABSTRACT

A bird feeder perch assembly comprising a flange and a perch rod with at least one pivot member located at a distal end; the pivot members extending axially along an axis in a direction generally perpendicular to the perch rod; where the flange has an attachment that allow it to be attached to the side wall of a bird feeder body; the flange comprising an underside portion that in use is in direct contact with said side wall of a bird feeder body; the flange having at least one recess in the underside and an aperture therethrough located adjacent the recess or between the recesses; the aperture and recess being configured to accept the perch member; a pivot member being housed within the recess and the perch rod extending through the slot, such that in use the perch member may pivot, from a retracted position in which the perch is alongside the feeder body to an extended position in which the perch projects outwardly from the body.

16 Claims, 4 Drawing Sheets

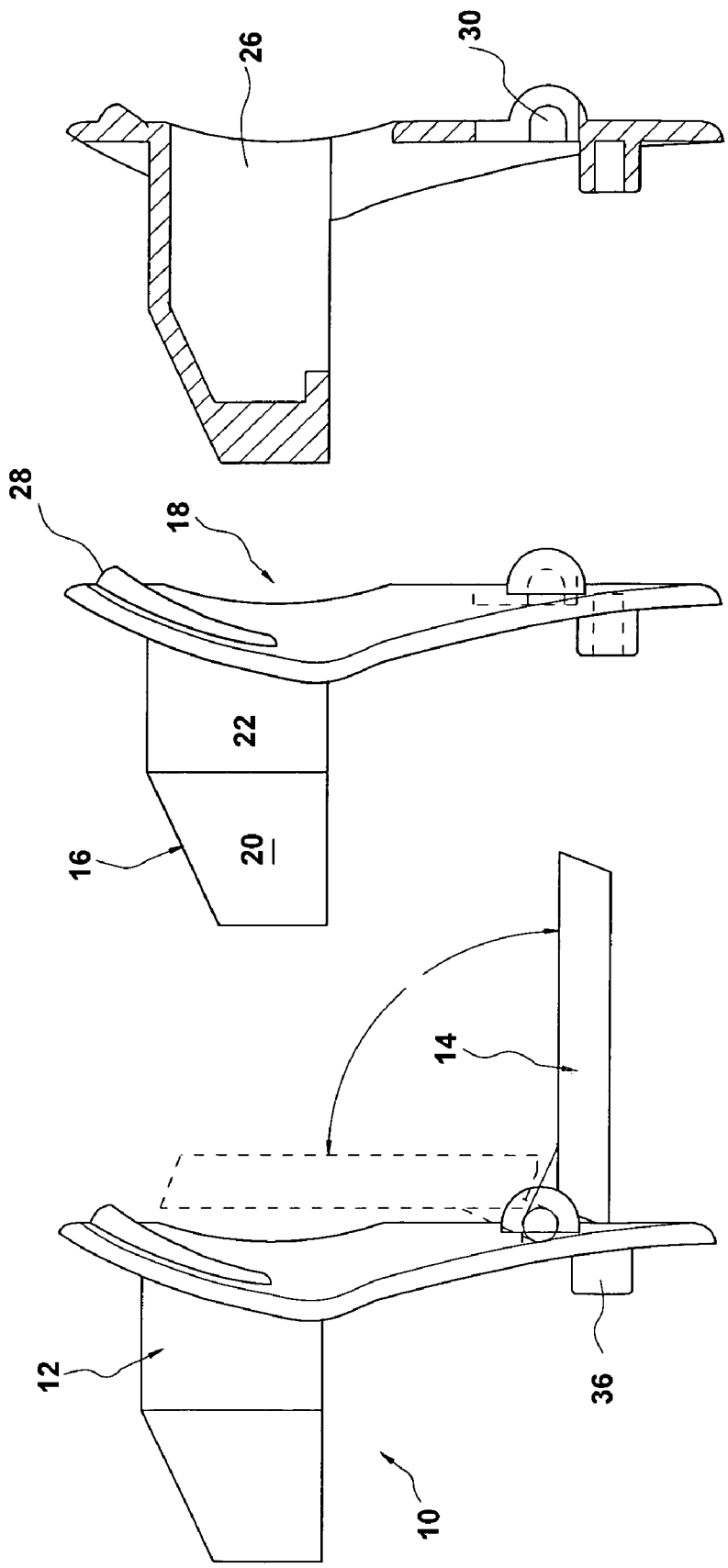

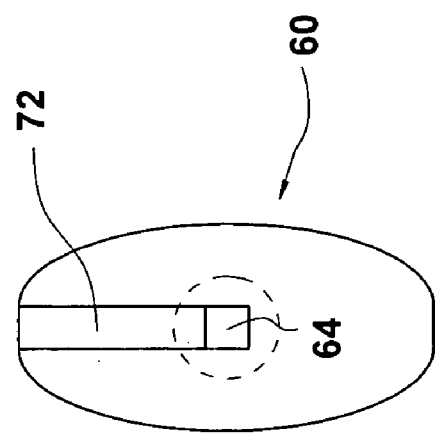
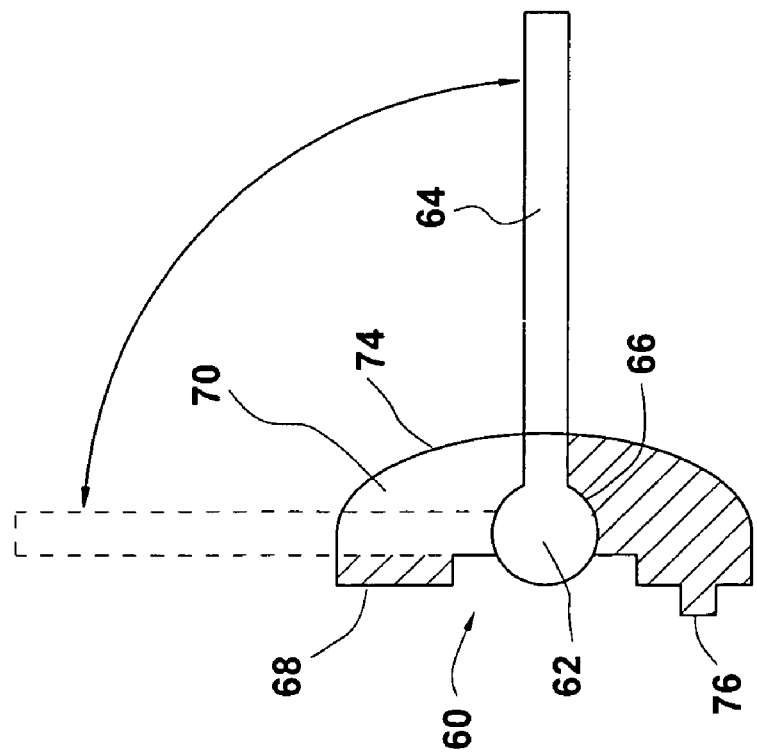

PERCH ASSEMBLY

BACKGROUND OF THE INVENTION

The present invention relates to a perch assembly for use with bird feeders and in particular to a pivoting perch.

Bird feeders having perches attached thereto are well known. Frequently, the perch comprises a rod fixed to a base member of the feeder or to individual feeding ports. Such feeding ports typically comprise a locating member with a central aperture; the member being configured to locate within a wall portion of the feeder. Bird feeders tend to be packaged for sale in a fully assembled state; consequently, feeders with one or more protruding perches require a packing box considerably larger in cross section than the cross section of the feeder body. This is wasteful, and ultimately results in an environmental penalty; due to the cost of the packaging and its disposal.

BRIEF SUMMARY OF THE INVENTION

An object of the present invention is to provide an improved bird feeder perch, and in particular a perch of simple construction that pivots.

In one aspect the invention comprises a bird feeder perch assembly having a locating member and a perch member; where the said perch member has an elongate portion and a pivot member located at a distal end thereof; wherein the locating member has attachment means that allow this member to be attached to the side wall of a bird feeder body; the locating member further comprising an underside portion that in use is in direct contact with said side wall of a bird feeder body wherein the locating member has an aperture and a first recess in said underside portion adjacent said aperture; said aperture and recess being configured to accept the perch member; said pivot member being pivotally housed within said first recess; said elongate portion of the perch member extending through said aperture, such that in use the perch member may pivot, about a pivot axis, from a retracted position to an extended position in which it projects outwardly from the body such that a bird may rest upon the perch. Preferably, in the retracted position the elongate portion of the perch member is alongside said feeder body.

Preferably, the pivot member extends axially away from the perch member. The perch assembly may comprise a second recess in the underside of the locating member; the aperture being between the first recess and the second recess.

The perch member may comprise a rod that extends in a direction that is substantially perpendicular to the axis of the pivot member. The perch member may be "T-shaped" or "L-shaped". The perch assembly may comprise two pivot members, extending from opposite sides of the rod and sharing a common axis. Preferably, the recess is U-shaped.

The perch member may comprise a rod. The perch member may comprise a bridging member located between the rod and at least one pivot member wherein the bridging member results in the pivot axis being displaced further away from the longitudinal axis of the rod. Preferably, the longitudinal axis of the bridging member is inclined at an angle in the range 10° to 40° to the longitudinal axis of the rod. This arrangement advantageously allows the perch rod to pivot through an angle of about 90° and so allow retraction of the perch rod to a position flush with the outer surface of the main body of a bird feeder.

Preferably, that end of the perch rod proximal the pivot member has a beveled abutment face that in the fully extended position abuts against an outer surface of the locating means, and the locating means may take the form of a flange; this advantageously limits further downward pivotal movement of the perch rod and concentrates any load from the weight of a perched bird onto the locating member.

The first recess may be, at least in part, hemispherical in shape; a portion of this hemisphere may be connected to the aperture. The pivot member may be, at least in part, hemisphrical in shape.

Preferably, the perch member comprises a rod. The slot or aperture in the locating member or flange may have a shape substantially defined by a rectangle combined with two circle segment portions at each end.

The locating member or flange may also be part of a feeding port.

Preferably, in use the pivot member is sandwiched between the locating member and the outer body of a bird feeder. This arrangement advantageously simplifies construction and minimizes the number of components to be assembled.

The bird feeder perch assembly may also comprise a locating member and a perch member; where the said perch member is elongate and has a pivot member located at a distal end thereof; the pivot member extending axially away from the perch member; the locating member further comprising an underside portion that in use is in direct contact with said side wall of a bird feeder body wherein the locating member has a recess in the underside and an aperture adjacent said recess; said aperture passing from the underside to a topside of the locating member; said aperture and recess being configured to accept the perch member; said pivot member being housed within said recess; the perch member extending through the aperture, such that in use the perch member may pivot, about a pivot axis, from a retracted position to an extended position in which it projects outwardly from the body such that a bird may rest upon the perch. Preferably, in the retracted position the elongate portion of the perch member is alongside said feeder body.

BRIEF DESCRIPTION OF THE DRAWINGS

Embodiments of the invention will now be described by reference to the following diagrammatic figures in which:

FIG. 1 is a side view showing the perch assembly according to a first embodiment of the invention in a fully extended position and in a retracted position (broken lines);

FIG. 2 is a side view of the flange/locating member of the assembly of FIG. 1 alone;

FIG. 3 is a cross section corresponding to FIG. 2;

FIGS. 12 and 13 show a perch assembly according to a second embodiment of the invention.

DETAILED DESCRIPTION OF THE INVENTION

FIG. 1 shows a side view of a perch assembly 10 according to a first embodiment of the invention; the assembly being in a fully opened position. The assembly comprises a first part (locating member) 12 and a perch member 14.

Figure 4:
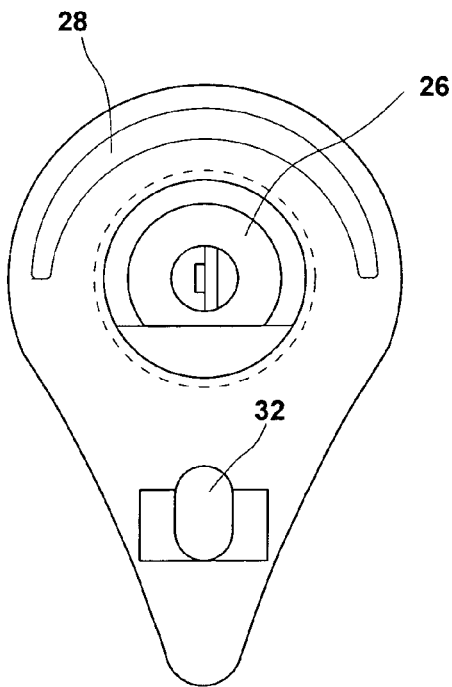
FIG. 4 is a front view corresponding to FIG. 2.
Figure 6:
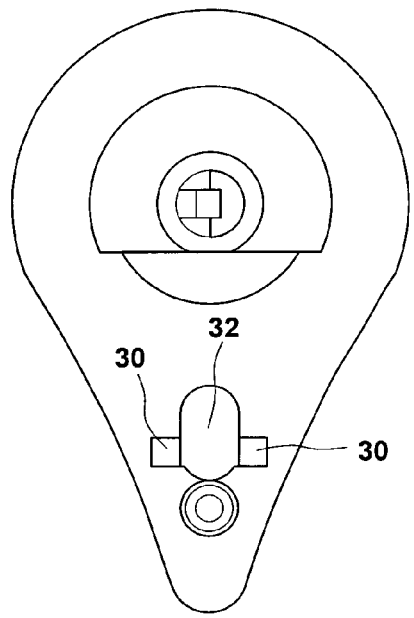
FIG. 6 is a rear view corresponding to FIG. 2.
Figure 5:
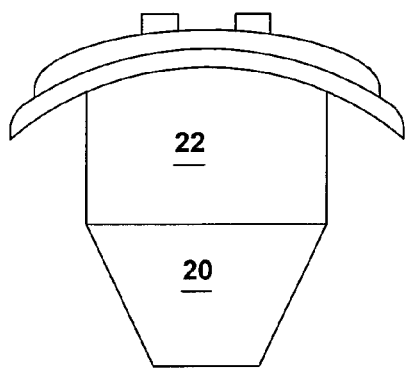
FIG. 5 is a plan view corresponding to FIG. 2.
Figure 7:
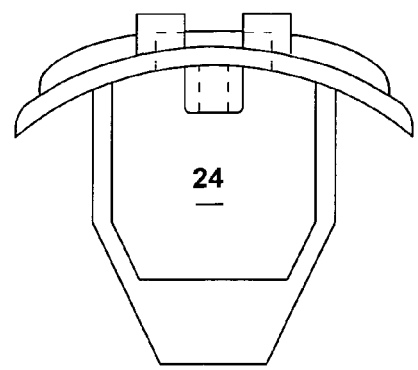
FIG. 7 is an underside view corresponding to FIG. 2.

The locating member 12 may take various forms including a flange and a bird feeder port (as shown in FIGS. 2 to 7). The locating member 12 may, in use, be located in a suitable sized aperture of a bird feeder body and may have attachment means for fixing to a wire bird feeder cage grid or the like. In the present embodiment the locating member takes the form of a feeding port 12 comprises a feed distributor 16 and a flange 18. Feed distributor 16 comprises a truncated frustroconical portion 20, and a truncated cylindrical portion 22. Portions 20 and 22 are truncated below their lower half so that, in use, seed may enter the port 12 via the orifice 24 formed by these truncations.

Flange 18 presents a circular orifice 26 via which, in use, a bird may access seed with its beak from the bird feeder. The upper portion of flange 18 has a hood 28 that is positioned so that in use it shields the aperture against rainfall and thus helps keep bird feed dry. The lower portion of flange 18 has a U-shaped recess 30 in the underside, located either side of an aperture 32 through the flange. Recesses 30 provide pivot means for the perch member 14 (see later). Aperture 32 is preferably located mid-way between recesses 30 and preferably has straight sides and arced or semi-circular top and bottom edges. Aperture 32 is provided to allow part of the perch member to pass through and in part to limit pivotal movement of the perch. Flange 18 also has on its underside a protruding notch 36 that, in use, locates a hole in the main body of the bird feeder.

Figure 8:
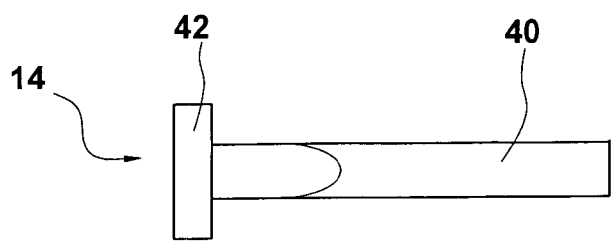
FIGS. 8 to 11 are various views of the perch member/rod shown in FIG. 1.
Figure 9:
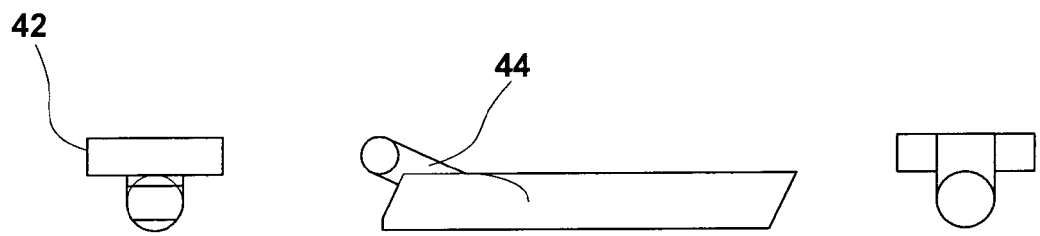
Figure 10:
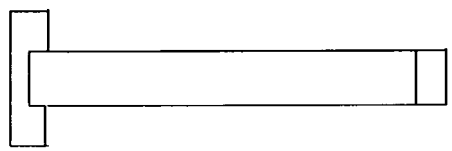
Figure 11:
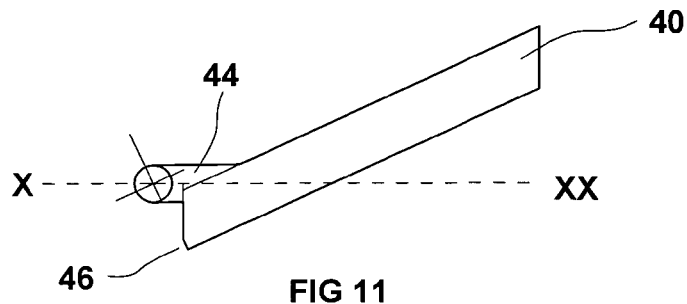

FIGS. 8 to 11 show various views of the perch member 14 used in this embodiment. Perch member 14 comprises a rod 40 and pivot member 42 and a bridging member 44; pivot member 42 extends axially in a direction that is generally perpendicular to the longitudinal axis of rod 40. Pivot member 42 is preferably connected to the rod 40 by a relatively short bridging member 44. Thus, part of the pivot member extends either side of the rod (see plan view shown in FIG. 8) such that the perch member is generally "T-shaped". The portions of the pivot member 42 that extend either side of the rod 40 in use are pivotally mounted in recesses 30 and held therein in use by the underside portion of flange 18 being in contact with the side wall of a bird feeder body. Thus, in use pivot member 42 is retained in place between flange 18 and the side wall of a bird feeder body. The provision of bridging member 44 allows the abutment face 46 of rod 40 to abut the lower front face of flange 18 when the perch assembly is in a fully extended position, as shown in FIG. 1. The broken lines in FIG. 1 show the perch member in a retracted position in which the perch rod 40 lies substantially up against the outer surface of the flange 18 and so also generally alongside the wall of a bird feeder body in use. Abutment face 46 lies on a plane that is preferably perpendicular to the longitudinal axis of rod 40. Bridging member 44 has an axis X-XX (see FIG. 11) that preferably extends at an acute angle from the longitudinal axis of rod 40, preferably at an angle in the range 10° to 40°. The rod 40 may have a circular cross section. Pivot members 42 preferably have a circular cross section so that they smoothly pivot in recesses 30, which preferably have a U-shaped cross section to assist a hinge action.

FIGS. 12 and 13 shows a perch assembly 60 according to a second embodiment of the invention where the pivot action is not provided by a pivot rod or rods; but rather by a pivot ball 62 positioned at the distal end of perch rod 64 the pivot ball being mounted in a generally hemispherical shaped recess 66 positioned between the underside 68 of a locating member 70 and an aperture 72 in the locating member, the aperture 72 being located between the topside 74 of the locating member and the recess 66. The aperture is generally rectangular in cross section and the perch rod preferably has a square or rectangular cross section; this prevents the perch rod rotating about its axis and also limits pivotal movement of the perch rod to the vertical plane. The locating member 70 has attachment means 76 to facilitate attachment to a bird feeder body. Locating member 70 is preferably made of a resilient plastics material.

In a third embodiment (not shown) the "T-shaped" perch member is formed from a perch rod and two pivot members each member extending sideways in a different direction and the two pivot members sharing a common (pivot) axis. In both the first and the third embodiment the use of a bridging member is optional.

What is claimed is:

1. A bird feeder perch assembly comprising a locating member and a perch member; where the said perch member has an elongate portion and a pivot member located at a distal end thereof; wherein the locating member has attachment means that allow this member to be attached to the side wall of a bird feeder body; the locating member further comprising an underside portion that in use is in direct contact with said side wall of a bird feeder body wherein the locating member has an aperture and a first recess in said underside portion adjacent said aperture; said aperture and recess being configured to accept the perch member; said pivot member being pivotally housed within said first recess; said elongate portion of the perch member extending through said aperture, such that in use the perch member may pivot, about a pivot axis, from a retracted position to an extended position in which it projects outwardly from the body such that a bird may rest upon the perch.

2. A perch assembly according to claim 1 wherein the pivot member extends axially away from the perch member.

3. A perch assembly according to claim 1 comprising a second recess in the underside of the locating member; said aperture being located between the first recess and the second recess.

4. A perch assembly according to claim 3 wherein the perch member comprises a rod that extends in a direction that is substantially perpendicular to the axis of the pivot member.

5. A perch according to claim 4 wherein the perch member is "T-shaped" or "L-shaped".

6. A perch assembly according to claim 4 comprising two pivot members, extending from opposite sides of the rod and sharing a common axis.

7. A perch assembly according to claim 4 wherein at least one of the first and second recesses is "U-shaped".

8. A perch assembly according to claim 4 comprising a bridging member located between said rod and said pivot member wherein said bridging member results in the pivot axis being displaced from, or further from, the longitudinal axis of the rod.

9. A perch assembly according to claim 8 wherein the bridging member has a longitudinal axis that is inclined at an angle in the range 100 to 40° to the longitudinal axis of the rod.

10. A perch assembly according to claim 4 wherein the end of the rod proximal the pivot member has an abutment face.

11. A perch assembly according to claim 1 wherein the recess is in part hemispherical in shape apart from a portion that is directly connected to the aperture.

12. A perch according to claim 11 wherein the pivot member is at least in part hemispherical in shape.

13. A perch assembly according to claim 1 wherein the perch member comprises a rod with a longitudinal axis.

14. A perch assembly according to claim 1 wherein said aperture has a shape substantially defined by a rectangle sandwiched between two circle segment portions.

15. A perch assembly according to claim 1 wherein the locating member forms part of a feeding port.

16. A perch according to claim 1 wherein in use the pivot member or members are sandwiched between the locating member and the side wall of a bird feeder body.

* * * * *